Figure 1:
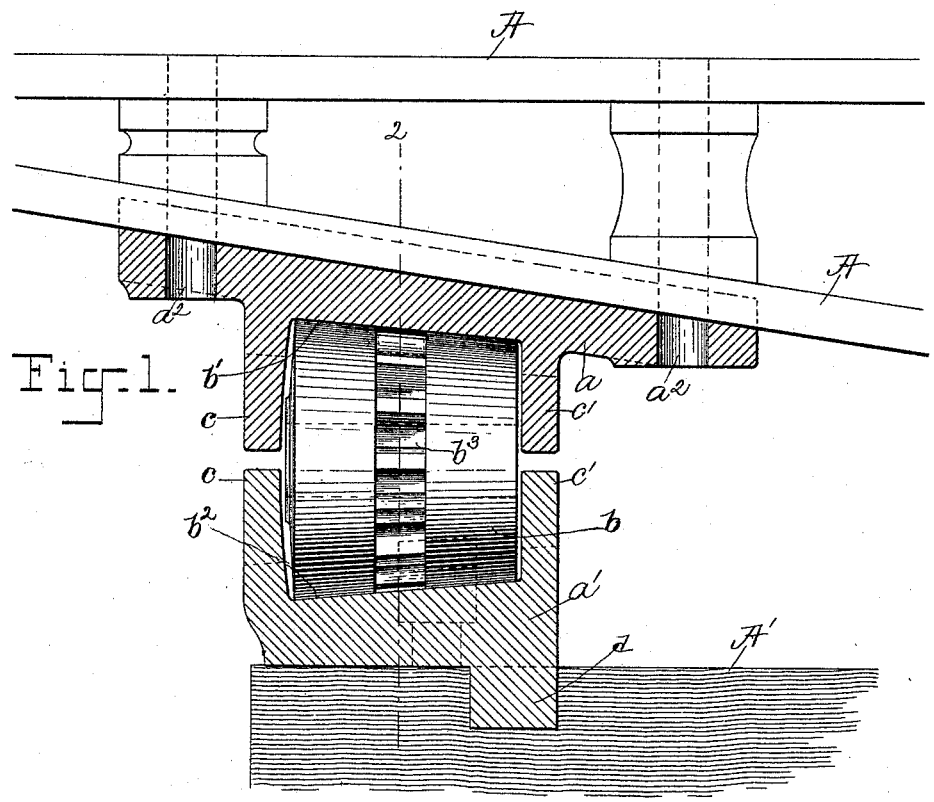

(No Model.) 2 Sheets—Sheet 1.

J. JESSEN.
ANTIFRICTION SIDE BEARING FOR CARS.

No. 498,795. Patented June 6, 1893.

Witnesses.
John F. Nelson.
J. Murphy.

Inventor.
Jacob Jessen
By Jas. H. Churchill
Atty.

THE NORRIS PETERS CO., PHOTO-LITHO., WASHINGTON, D. C.

(No Model.) 2 Sheets—Sheet 2.
J. JESSEN.
ANTIFRICTION SIDE BEARING FOR CARS.

No. 498,795. Patented June 6, 1893.

Witnesses.
John F. Nelson
J. Murphy

Inventor.
Jacob Jessen
By Jas. H. Churchill
Atty.

UNITED STATES PATENT OFFICE.

JACOB JESSEN, OF BOSTON, ASSIGNOR TO FRANCIS W. PARSONS, OF OSTERVILLE, MASSACHUSETTS.

ANTIFRICTION SIDE BEARING FOR CARS.

SPECIFICATION forming part of Letters Patent No. 498,795, dated June 6, 1893.

Application filed August 26, 1892. Serial No. 444,170. (No model.)

*To all whom it may concern:*

Be it known that I, JACOB JESSEN, residing at Boston, county of Suffolk, and State of Massachusetts, have invented an Improvement in Antifriction Side Bearings for Railway-Cars, of which the following description, in connection with the accompanying drawings, is a specification, like letters on the drawings representing like parts.

This invention relates to a novel anti-friction side bearing for railway car bodies.

Railway cars as now constructed and known to me have been provided with side bearings made as flat plates secured to the car body bolster and to the truck bolster, the said plates being in contact with each other. So also rollers have been placed between the said bearing plates to reduce the friction and assist the truck in curving. The trucks of railway cars occupy a position in line with the car body, when the car is running on a straight track, but when rounding a curve, the truck is thrown into a position, out of line with the car body, and the weight of the car creates a great friction between the wheels of the truck and the side of the rails until the truck and car body have again been brought into line with each other.

This invention has for its object to provide a side bearing of a novel construction as will be described, whereby the weight of the car is caused to act on the side bearing to assist in restoring the truck and car body to their normal position in line with each other and thereby reduce the friction between the car body and its truck and also reduce the wear upon the flange of the wheel and the sides of the rail.

In accordance with my invention, I have provided the railway car with cup-shaped or concaved side bearings, preferably having interposed between them an anti-friction roller. The cup-shaped or concaved side bearings preferably have their concavity tapering or conical in form to correspond to and co-operate with a conical roller, and one of the cup-shaped or concaved bearing plates or surfaces, preferably the upper one, is provided with teeth of considerably less width than the width of the bearing plate surface, and with which mesh gear teeth on the anti-friction roller, the gear teeth being preferably made on the roller substantially near the longitudinal center of the same, to leave smooth bearing surfaces on opposite sides of the gear teeth.

The particular features in which my invention consists will be pointed out in the claims at the end of this specification.

Figure 2:
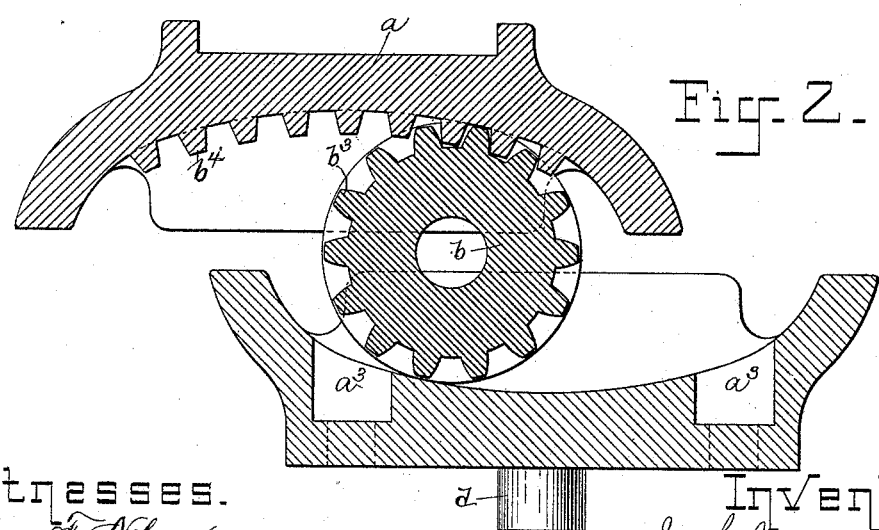
Figure 3:
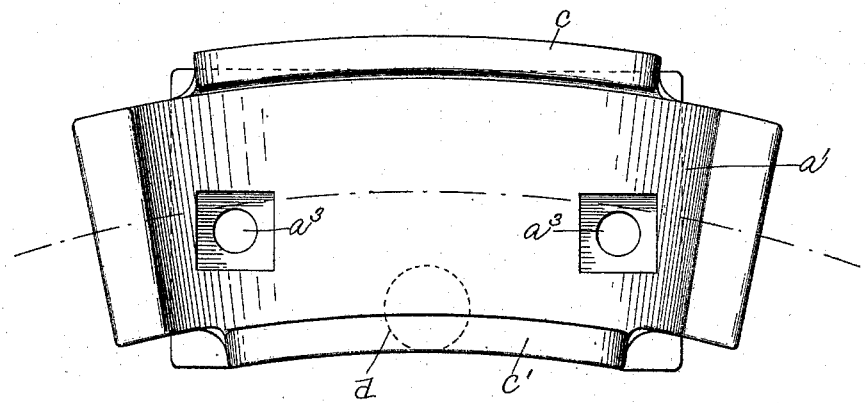
Figure 4:
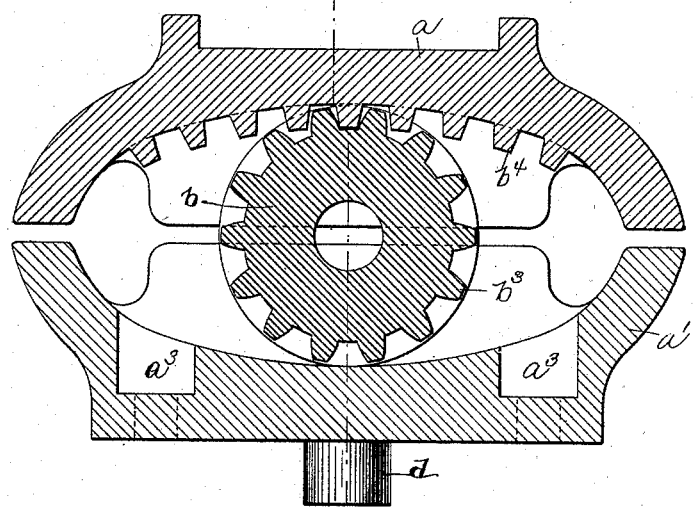

Figure 1 is a partial section and elevation of a sufficient portion of a car body and its truck provided with an anti-friction side bearing emodying my invention, to enable it to be understood, the section through the side bearing being taken on the line 1—1 Fig. 4, the roller being shown in elevation. Fig. 2 is a longitudinal section of the side bearing shown in Fig. 1, with the bearing plates in the position they occupy when the car is rounding a curve, the section being supposed to be taken on the line 2—2 Fig. 1; Fig. 3 a top or plan view of the lower cup-shaped plate or bearing surface shown in Fig. 1, and Fig. 4 a longitudinal section on the line 2—2 of the bearing shown in Fig. 1, the parts being in the position they occupy when the car is running on a straight track.

Referring to Fig. 1, A represents the car body bolster and A' the car truck bolster of a railway car, which may be of any usual or well-known construction. The bolsters A, A', have interposed between them a side bearing embodying my invention and consisting as herein shown of two cup-shaped or concaved bearing plates or castings $a$, $a'$, the bearing plate or casting "$a$" being in practice secured to the car body bolster A, as by bolts not shown, but which are extended up through suitable holes $a^2$, and the bearing plate or casting $a'$ being secured to the truck bolster A' by bolts not shown, extended through suitable holes $a^3$.

The cup-shaped or concaved bearing plates or castings have preferably interposed between them an anti-friction roller $b$, preferably made conical or tapering toward the center of the car truck, the inner or bearing surfaces $b'$, $b^2$, of the castings $a$, $a'$, being made conical to correspond to the shape of the roller $b$. The conical roller $b$ is maintained in correct working position between the cup-shaped bearing plates or casting $a$, $a'$, as herein shown, by means of gear teeth $b^3$ on the roller engaging corresponding rack or gear teeth $b^4$ made in one of the bearing plates or castings, preferably the upper one. The gear teeth $b^3$ are made to extend but a substantially small portion of the length of the roller "$b$" so as to leave a substantially large amount of smooth bearing surface, which makes contact with like smooth portions of the upper and lower castings $a, a'$.

To protect the bearing from dust, dirt, &c., I prefer to provide the cup-shaped plates or castings $a, a'$ with side flanges $c, c'$. The flanges $c, c'$ also serve to prevent undue lateral motion of the anti-friction roller. The lower bearing plate or casting $a'$ is preferably provided with a preferably cylindrical stud or projection $d$, which fits into a suitable recess or hole in the truck bolster, and which acts to relieve the bolts securing the bearing plate to the truck bolster, from strain or shearing action. So also in operation, the top plate or casting $a$ and the roller $b$ occupy the position shown in Fig. 4, when the car is running on a straight track, but when rounding a curve, the roller $b$ is carried up on the curve of the lower bearing plate or casting $a'$ and lifts the upper bearing plate or casting $a'$ and the car body, and when the trucks again strike a straight portion of the track, the weight of the car body acts in a reverse manner and assists in returning the roller $b$ to its normal position shown in Fig. 4, thereby reducing the friction between the car body and its truck and avoiding the wearing of sharp flanges on the wheels and also the wear on the side of the rails.

I claim—

1. The combination with a car body and its truck, of an anti-friction side bearing therefor consisting of a cup-shaped or concaved upper bearing surface or plate attached to the car body, a cup-shaped or concaved lower bearing surface or plate secured to the truck, one of the said surfaces or plates having gear teeth extended but a portion of its width, and an anti-friction roller interposed between and within the cup-shaped surfaces or plates and provided with gear teeth extended but a portion of its length, substantially as described.

2. The combination with a car body and its truck, of an anti-friction side bearing therefor consisting of a cup-shaped or concaved upper bearing surface or plate attached to the car body, a cup-shaped or concaved lower bearing surface or plate secured to the truck, the inner concaved surfaces of the said bearing plates being made conical or tapering as described, and a conical anti-friction roller interposed between the said bearing plates, substantially as described.

3. The combination with a car body and its truck, of an anti-friction side bearing therefor consisting of a cupshaped or concaved upper bearing surface or plate attached to the carbody, a cup-shaped or concaved lower bearing surface or plate secured to the truck, one of the said surfaces or plates having gear teeth extended but a portion of its width, and an anti-friction roller interposed between and within the cup-shaped surfaces or plates and provided with gear teeth extended but a portion of its length, and side flanges on the said cup-shaped bearing surfaces, substantially as described.

In testimony whereof I have signed my name to this specification in the presence of two subscribing witnesses.

JACOB JESSEN.

Witnesses:
JAS. H. CHURCHILL,
F. W. PARSONS.